United States Patent [19]

Chrobak et al.

[11] 4,056,929
[45] Nov. 8, 1977

[54] CHAIN QUICK-CONNECTING LINK

[75] Inventors: Eryk Chrobak, Siemianowice Slaskie; Benedykt Natkaniec, Katowice; Zenon Wasyleczko, Katowice; Antoni Stawinski, Katowice; Andrzej Roczek, Zabrze, all of Poland

[73] Assignee: Fabryka Sprzetu i Narzedzi Gorniczych im. Gen. Karola, Katowice, Poland

[21] Appl. No.: 663,696

[22] Filed: Mar. 4, 1976

[30] Foreign Application Priority Data

May 15, 1975 Poland .................................. 180422

[51] Int. Cl.² .............................................. F16G 15/04
[52] U.S. Cl. ........................................................ 59/85
[58] Field of Search ................................ 59/85, 86, 93

[56] References Cited

U.S. PATENT DOCUMENTS

| 523,441 | 7/1894 | Rae | 59/86 |
|---|---|---|---|
| 1,513,729 | 11/1924 | Adams | 59/85 |
| 2,819,586 | 1/1958 | Pierre | 59/85 |
| 3,822,549 | 7/1974 | Rieger | 59/85 |

FOREIGN PATENT DOCUMENTS 2,055,826  5/1972  Germany ................. 59/86

*Primary Examiner*—C.W. Lanham
*Assistant Examiner*—Gene P. Crosby

[57] ABSTRACT

A quick-connecting link is disclosed having two identical half-links. Each half-link has two arms. One arm ends in a stepwise section and the other arm ends in a stepwise recess. An insert member is held by parallel pins between the two recessed ends of the assembled half-links. The assembly is held together by an expanded sleeve which extends through the insert member, and which lies between and secures the parallel pins.

2 Claims, 2 Drawing Figures

CHAIN QUICK-CONNECTING LINK

BACKGROUND OF THE INVENTION

This invention relates to a quick-connecting link applicable to for connecting driving chains, especially for power chains of transfer drives in machines employed in mining.

The quick-connecting links are used for connecting of two ends of a chain in order to make a closed loop thereof, or for quick exchanging of a failed link. The driving chains working in mining machines used for winning coal as coal planes and combined cutter loader, are affected by alternating dynamic loads. As a result, high strength under dynamic loads is required from individual links of the chain, especially for quick-connecting links.

Known chain quick-connecting links are composed of two half-links differing from each other and having stepped cross-sections of their arms. Co-operating arms of the half-links are connected by means of pins. A disadvantage of the design consists in its low resistance to dynamic loads due to frequent disconnecting of the half-links caused by falling out of the pins from the holes of the arms, although they are made of hard steel and rivetted.

Other known designs of the chain quick-connecting link are characterized by their arms being connected by means of teeth, and recesses corresponding therewith.

The link does not comply, however, with the strength requirement, since in the course of operation, it gets deformed, resulting in parting of the arms of the half-link in effect of decomposition of forces acting on the link into components, what causes disconnecting of meshed teeth of both half-links, and thus a breaking of the connection.

At last a chain quick-connecting link is known as in German Federal Republic Pat. No. 1,140,411 issued June 20, 1976. The half-links therein are connected by means of pins but owing to improper decomposition of the forces acting on the pins, the half-links do not meet the strength requirement.

SUMMARY OF THE INVENTION

The object of the invention is to provide a new constructional design of the quick-connecting link meeting the requirement of the highest required strength and of the resistance to alternating loads.

According to the invention said object has been achieved by one arm of the half-link being ended stepwise on both sides with decreasing cross-section in the plane of the longitudinal axis. The second arm is ended in the same axis stepwise on both sides with growing larger recess. Due to these forms of arms the complete chain quick-connecting link is built of two identical half-links. Both half-links are connected with pins passing through the holes in the arms of the half-links and through the spacer insert located between the arms of the half-links.

Inside the spacer insert an expanding sleeve is located passing between the pins at the place of their narrowed cross-sections in such way that the sleeve secures the pins against falling out from the arms of the half-link, and thereby prevent undesired disconnecting of the link.

The advantage of the design according to the present invention provides in twice higher resistance to alternating loads, an increase of the static strength, and simple and compact structure.

BRIEF DESCRIPTION OF THE DRAWING

The invention will be now specified more particularly by means of an exemplary embodiment with reference to the accompanying drawings in which.

DESCRIPTION OF THE PREFERRED EMBODIMENTS

Figure 1:
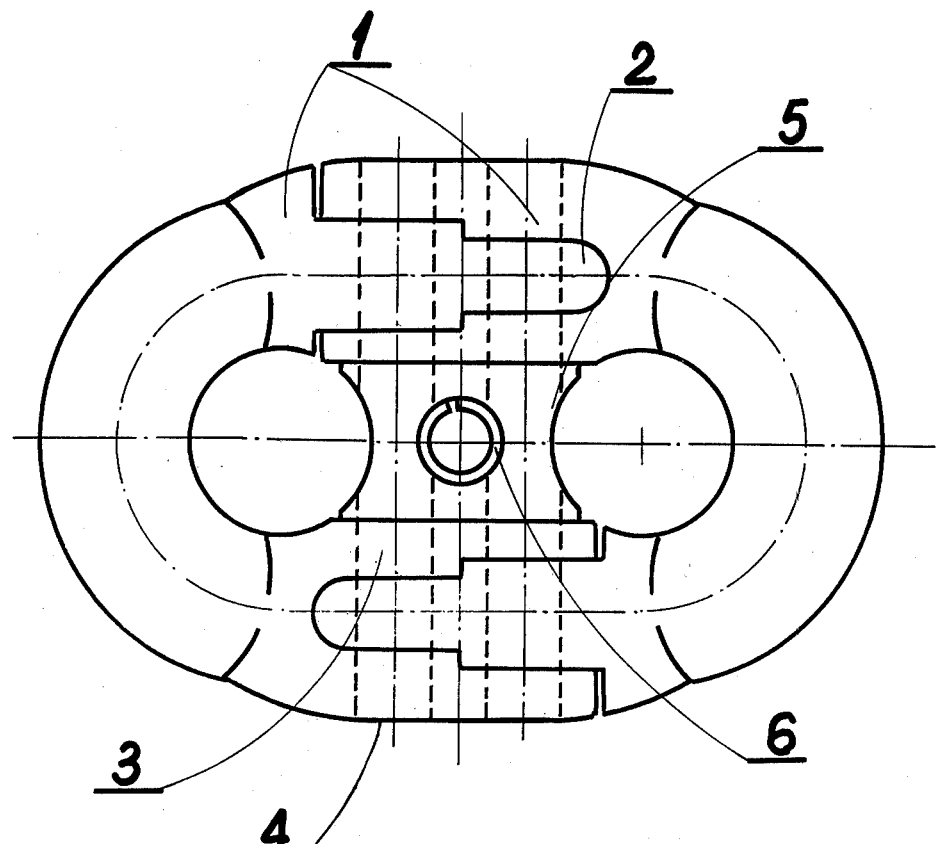
FIG. 1 is the top view of the link.
Figure 2:
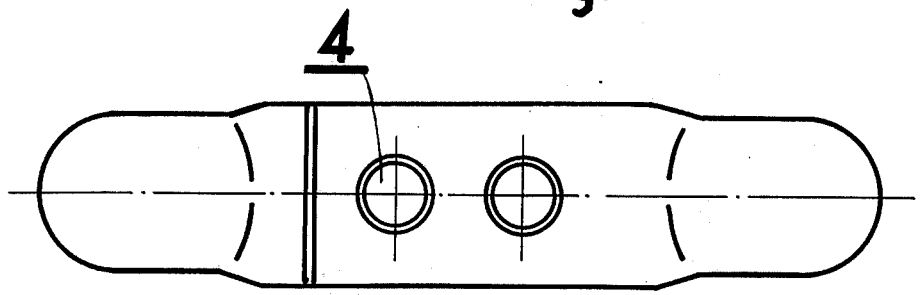
FIG. 2 is the side view thereof.

The quick-connecting link according to the invention consists of two identical half-links 1, one arm 2 of the half-link 1 being ended with on both sides stepwise with growing smaller cross-section in the plane of the longitudinal axis. The other arm 3 is ended in the same axis with on both sides stepwise growing larger recess.

Both half-links 1 are connected into a uniform and rigid unit by means of pins 4 passing through the holes in the arms 2 and 3 of the half-links 1. The spacing insert 5 is located between the arms 2 and 3 of the half-links 1. On the inside of the spacing insert 5, an expanding sleeve 6 is located the latter passes between the pins 4 at the place of narrowed cross-sections thereof, thus securing the pins against falling out from the arms 2 and 3 of the half-link 1, and thereby securing the link against undesired disconnecting.

We claim:

1. A quick-coupling link for driving chains comprising: two identical half-links, each identical half-link having at its one end a forwardly extending projection having a longitudinal axis, said projection having a stepped portion along said longitudinal axis, the other end of each link having a stepped-shaped slot portion, said projection and said slot portion lying substantially in the same plane as the remainder of said half-link; spacing insert means between said ends of said links; pin means passing through said projection and said slot portion for permanently interconnecting said two half-links, the two ends of each half-link having at least two cylindrical openings with axes lying substantially in said plane; an expanding sleeve in said spacing insert means for inhibiting removal of said pin means from said half-links, said pin means passing through said cylindrical openings.

2. A quick-coupling link for driving chains as defined in claim 1 wherein said stepped portion is shaped to conform to the stepped-shaped slot portion, the stepped portion of one link extending into the stepped-shaped slot portion of the other link, the extreme end of said projection having a smaller stepped cross-section than the remaining part of said projection, said remainder of said half-link having a substantially semi-circular shape, the axis of the cross-section of said semi-circular shape lying substantially in said plane, said semi-circular shape forming with said spacing insert means a substantially circular opening, said pin means comprising two pins passing through said cylindrical openings, said expanding sleeve being located between said two pins and being held within said spacing insert means.

* * * * *